United States Patent
Forbes

(10) Patent No.: US 10,778,810 B2
(45) Date of Patent: Sep. 15, 2020

(54) STAGING AND DEPLOYMENT TO MULTIPLE SERVICE CLOUDS

(71) Applicant: salesforce.com, inc., San Francisco, CA (US)

(72) Inventor: Randall S. Forbes, Fishers, IN (US)

(73) Assignee: salesforce.com, inc., San Francisco, CA (US)

(*) Notice: Subject to any disclaimer, the term of this patent is extended or adjusted under 35 U.S.C. 154(b) by 584 days.

(21) Appl. No.: 15/275,459

(22) Filed: Sep. 25, 2016

(65) Prior Publication Data
US 2018/0091624 A1    Mar. 29, 2018

(51) Int. Cl.
| | |
|---|---|
| H04L 29/08 | (2006.01) |
| G06F 8/60 | (2018.01) |
| G06F 8/65 | (2018.01) |
| G06F 9/50 | (2006.01) |
| H04L 12/741 | (2013.01) |

(52) U.S. Cl.
CPC .............. *H04L 67/34* (2013.01); *G06F 8/60* (2013.01); *G06F 8/65* (2013.01); *G06F 9/5072* (2013.01); *H04L 45/74* (2013.01); *H04L 67/36* (2013.01)

(58) Field of Classification Search
CPC ..... H04L 41/0806; H04L 45/74; H04L 67/02; H04L 67/10; H04L 67/34; H04L 67/36; G06F 8/60; G06F 8/61; G06F 8/65; G06F 8/71; G06F 9/445; G06F 9/45558;
(Continued)

(56) References Cited

U.S. PATENT DOCUMENTS

| 8,516,477 B1 | 8/2013 | Kearns et al. |
| 2007/0180018 A1 | 8/2007 | Srinivasan et al. |

(Continued)

OTHER PUBLICATIONS

Berners-Lee, T., Fielding, R., and L. Masinter, "Uniform Resource Identifiers (URI): Generic Syntax", RFC 2396, DOI 10.17487/RFC2396, Aug. 1998, <https://www.rfc-editor.org/info/rfc2396> (Year: 1998).*

(Continued)

*Primary Examiner* — Nicholas R Taylor
*Assistant Examiner* — Michael Li
(74) *Attorney, Agent, or Firm* — Butzel Long

(57) ABSTRACT

The technology disclosed describes staging and deploying major releases, updates and hot fixes to service clouds spanning data centers that include hardware stacks. User-specified builds of deployable installations are received as file sets, and the installations are staged to local storage at the data centers. User-specified deployment launch specifications that specify multiple already-staged deployable installations and service clouds to execute a deployment are received; and asynchronous, concurrent deployment of the multiple deployable installations by the service clouds based on the deployment launch specification are launched. Deployment controllers select a latest deployable installation staged to the service clouds, install and start staged applications in the latest deployable installation, remap incoming API URLs from a replaced version to the started staged application in the latest deployable installation, inventory dependencies, post-remapping, on the replaced version and mark the replaced version for deletion if no dependencies remain active; and report completion of deployment.

16 Claims, 11 Drawing Sheets

(58) Field of Classification Search
CPC .. G06F 9/45533; G06F 9/5027; G06F 9/5061; G06F 9/5072
See application file for complete search history.

(56) References Cited

U.S. PATENT DOCUMENTS

| | | | |
|---|---|---|---|
| 2012/0240135 A1* | 9/2012 | Risbood | G06F 9/44505 719/328 |
| 2012/0254289 A1* | 10/2012 | Sathish | G06Q 30/0631 709/203 |
| 2012/0266168 A1* | 10/2012 | Spivak | G06F 9/5055 718/1 |
| 2013/0232480 A1* | 9/2013 | Winterfeldt | G06F 8/60 717/177 |
| 2014/0130038 A1* | 5/2014 | Lucovsky | G06F 9/45533 717/176 |
| 2014/0344802 A1 | 11/2014 | Matov et al. | |
| 2015/0128121 A1 | 5/2015 | Garcia | |
| 2015/0355900 A1 | 12/2015 | Crosby et al. | |
| 2016/0173646 A1* | 6/2016 | Austel | G06F 9/45558 709/204 |
| 2016/0179499 A1* | 6/2016 | Reeves | G06F 8/61 717/172 |
| 2016/0196127 A1 | 7/2016 | Dey | |

OTHER PUBLICATIONS

IEEE Standard for Learning Technology-ECMA Script Application Programming Interface for Content to Runtime Services Communication, in IEEE Std 1484.11.2-2003, vol., No., pp. 0_1-0_27, 2004, doi: 10.1109/IEEESTD.2004.94435 (Year: 2004).*

PCT/US2017/053329—International Search Report and Written Opinion dated Dec. 14, 2017, 16 pages.

* cited by examiner

STAGING AND DEPLOYMENT TO MULTIPLE SERVICE CLOUDS

FIELD OF DISCLOSURE

The technology disclosed describes systems and methods for staging and deployment of cloud-based applications to multiple service clouds spanning multiple data centers, which include one or more hardware stacks per data center. The methods disclosed include managing digital data for a plurality of tenants to software instances, each tenant of the plurality of tenants comprising a group of users who share a common access with a specific set of privileges to a software instance of at least one application.

INTRODUCTION

Enterprise companies provide digital automation and analytics software and services via service clouds that map to data centers. For example, a marketing cloud can provision clients to a specific data center and make available a platform as a service (PaaS) that provides a set of applications that are usable by the client. Users can utilize customer relationship management (CRM) and other data for building and managing personalized email campaigns, and can connect social experiences to marketing, sales and service with social media applications. Analytics software and services include email, mobile, social and online marketing to clients. Additional applications make it possible to use short message service (SMS), multimedia messaging service (MMS), push notifications and group messaging to reach clients anytime, anywhere.

Service clouds can map across multiple data centers, and the application platform for creating PaaS can be implemented using multiple different software languages on any stack in any cloud. Applications that support clients across data centers and service clouds are constantly being developed and enhanced—motivating the need for a consistent, repeatable deployment process for major releases, minor software updates and for hot fixes to bugs.

An opportunity arises to manage staging and deployment of application releases, updates and hot fixes, making it feasible for very large enterprise service clouds and data centers to have improved operation.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

Disclosed systems and methods are usable for staging and deploying to multiple service clouds spanning multiple data centers that include one or more hardware stacks per data center. A disclosed method includes, at a workstation, receiving from a user builds of deployable installations as file sets; staging the deployable installations to local storage at the data centers; receiving from a user a deployment launch specification that specifies multiple already staged deployable installations and multiple service clouds to execute a deployment; and launching asynchronous, concurrent deployment of the multiple deployable installations by the multiple service clouds based on the deployment launch specification. The disclosed method also includes, at deployment controllers at each of the service clouds, selecting a latest deployable installation staged to the service clouds for installation, installing and starting staged applications in the latest deployable installation; remapping incoming API URLs from a replaced version to the started staged application in the latest deployable installation; inventorying dependencies, post-remapping, on the replaced version and marking the replaced version for deletion if no dependencies remain active; and reporting completion of deployment.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

An enterprise company typically deploys applications for their many clients, to multiple service clouds spanning multiple data centers that include one or more hardware stacks per data center.

Existing approaches for managing deployment for PaaS applications are limited, requiring manual intervention. In one example, for a major release deployment engineers need to deploy more than twenty applications to the PaaS, using a command line interface. To deploy one application would require six different commands and up to twenty minutes, depending on the size of the application. Furthermore, each of the applications would be deployed to three different regional clouds, one in each data center. To deploy twenty applications to three clouds using six commands each would require a total of three hundred sixty commands being written at the command prompt by deployment engineers, resulting in a slow serial deployment that could take as much as six hours. Manually deploying in parallel would require thirty minutes to deploy twenty apps. In both the serial and parallel deployment options, deployment mistakes can arise if operators open multiple windows—distracted deployment engineers could introduce user errors, such as losing the context of a deployment task. Also, when engineers are executing manual deployments from their local machines they are not able to focus on other tasks, as their computers are fully engaged in the manual deployment process.

It is also desirable to maintain an audit trail of the staging and the launching of applications as part of the management of deployment to multiple service clouds.

An environment for managing deployment to multiple service clouds spanning multiple data centers that include one or more hardware stacks per data center is described next.

Environment

Figure 1:
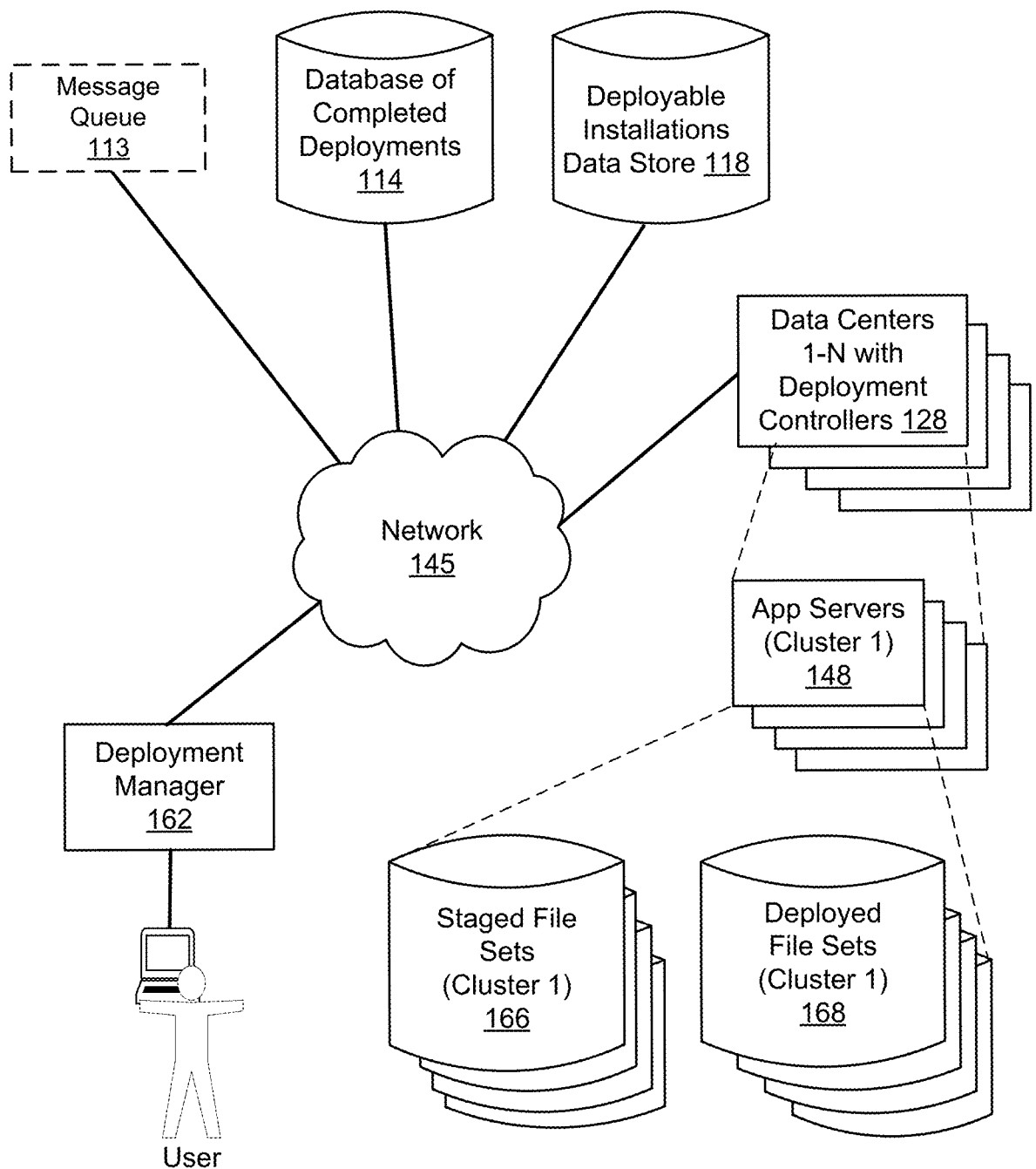
FIG. 1 illustrates one example implementation of a staging and deployment management environment.

FIG. 1 illustrates an example environment 100 for managing deployment to multiple service clouds spanning multiple data centers. Environment 100 includes a deployment manager 162 for receiving staging and deployment requests from a user who processes staging and deployments. Staging and deployment requests are published to message queue 113. Currently-deployable installations for multiple orgs are stored in deployable installations data store 118. When the message processing system notifies a data center that they have a deployment request, the deployment controller 128 'listening' to the message stream learns that they have a pending staging or deployment.

Environment 100 includes clusters of app servers 148 that serve data centers 1-N, with deployment controllers 128. In some implementations, organizations operate on a single pod. Clusters of servers that handle traffic exist as a logical unit sometimes referred to as a "superpod" which is a group of pods. Staged file sets 166 include stored staging message information and applications for deployment for a cluster, and other log data as described in more detail infra.

Additionally environment 100, for managing deployment to multiple service clouds spanning multiple data centers, includes a database of completed deployments 114 that provides a permanent record of completed deployments, enabling long-term deployment tracking and analysis. Database of completed deployments 114 get updated based on the results of staging and deployment messages from message queue 113.

In other implementations, environment 100 may not have the same elements as those listed above and/or may have other/different elements instead of, or in addition to, those listed above.

The disclosed technology for managing deployment to multiple service clouds spanning multiple data centers, described in detail below, tracks, stores and makes available staging and deployment results, on a request by request basis, in a multi-tenant environment that handles staging and deployment of new versions, minor application updates, and hot fixes for individual applications.

Figure 2:
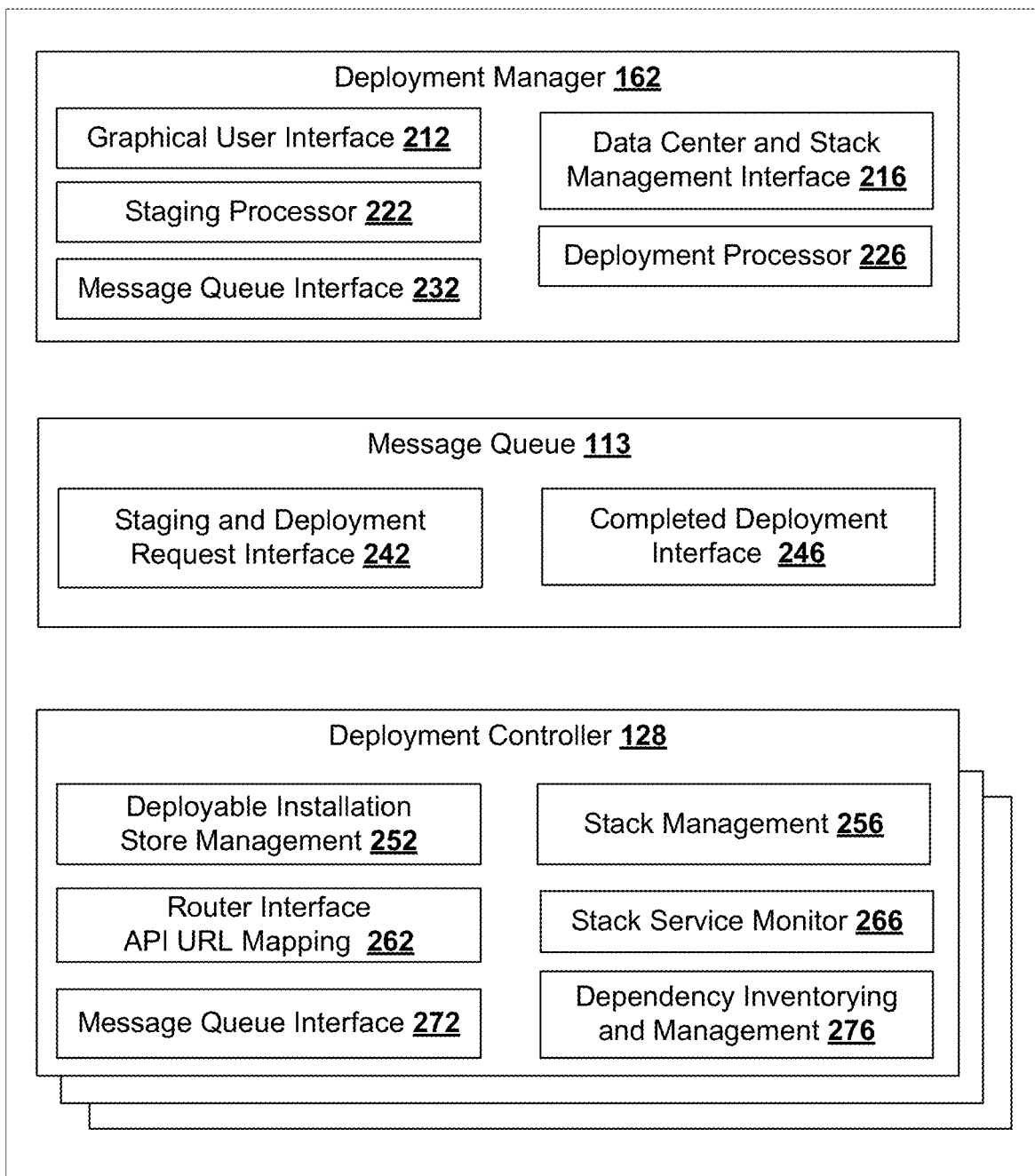
FIG. 2 shows an example block diagram for a deployment manager.

The FIG. 2 block diagram shows deployment manager 162, with graphical user interface (GUI) 212 for receiving requests from a deployment engineer and for reporting completion-of-deployment results from the completed deployment interface 246. Staging processor 222 receives user input from the GUI 212 and receives builds of deployable installations as file sets. Staging processor 222 also causes staging of the deployable installations to local storage at the data centers and sends messages to the staging and deployment request interface 242 of message queue 113, via the message queue interface 232. The staging process includes causing the staging to local storage at the data centers by the workstation posting a staging task to a messaging queue accessed by the deployment controllers, from which the deployment controllers draw tasks including the staging task. In some implementations, staging of the deployable installations to local storage at the data center is via posting to a work queue accessed by the deployment controllers. That is, staging processor 222 receives from a user a deployment launch specification that specifies multiple already-staged deployable installations and multiple service clouds to execute a deployment and, optionally, specifies stacks within the service clouds in the deployment launch specification. Data center and stack management interface 216 communicates to data centers 1-N. Deployment processor 226 directs launch of asynchronous, concurrent deployment of the multiple deployable installations by the multiple service clouds based on the deployment launch specification.

In one implementation, each data center has a deployment controller 128. In other implementations, a single data center can include multiple deployment controllers 128. The FIG. 2 block diagram shows deployment controller 128 with deployable installation store management 252 for updating staged file sets 166, based on user input received via the GUI 212. Router interface API URL mapping 262 updates the URLs of applications for staging and deployment to data centers, remapping incoming API URLs from a replaced version to the started staged application in the latest deployable installation. In some implementations, remapping is handled via a routing table of a message router within a deployment controller's respective service cloud that directs traffic within the service cloud to the hardware stacks. The routing table is granular to map particular API URLs by client organization, such that different client organizations can run different deployment versions of a single service accessed from outside the service cloud by a single API URL. Message queue interface 272 receives messages from message queue 113 relative to staging and deployment requests and sends messages reporting completed staging and deployment events. Stack management 256, in conjunction with stack service monitor 266, selects a latest deployable installation staged to the service clouds for installation, and installs and starts staged applications in the latest deployable installation. Dependency inventorying and management 276 inventories dependencies of other active stacks within the service cloud, post-remapping, on the replaced version and marks the replaced version for deletion if no dependencies remain active. The deployment controller 128 sets environment variables on hardware stacks in the multiple service clouds to support the remapping; and verifies that a staged application is in a started state prior to remapping the incoming API URLs.

The deployment controllers 128 are implemented as virtual machines linked to data centers, with one or more virtual-machine deployment controllers per data center. The disclosed deployment platform is the Stackato cloud platform-as-a-service (PaaS) which efficiently manages app deployment to the stack, in one implementation. Alternatively, the disclosed system could be a different cloud PaaS, such as Heroku. The implementation examples described next are shown in a Stackato context.

The example shows a service cloud data center identified via the StackatoCloudId, with an API endpoint used for connection to the service cloud. The default app URL is the base URL for the data center. The drain is the receiver for the log stream that includes messages that report completions of deployments. The drain name and the drain URL are logging variables to be used at the time of deployment. The next list describes the service cloud for the data center.

```
[StackatoCloud]
    [StackatoCloudId]
    [StackatoCloudName]
    [StackatoCloudApi]
Cloud
    [DefaultAppUrl]
    [DrainName]
    [DrainUri]
```

The service cloud app with appURL defining the URL prefix for the app is listed next.

```
[StackatoApp]
    [StackatoAppId]
    [FullName]
    [AppUrl]
```

The staging plan, StackatoStagingPlan, defines the scheme. FilePath includes the location of files prior to staging. Once a staging plan has been executed, the plan is locked so that history is preserved and changes cannot take place. The staging plan structure is listed next.

```
[StackatoStagingPlan]
    [StackatoStagingPlanId]
    [Name]
    [Version]
    [FilePath]
    [IsLocked]
```

Figure 3:
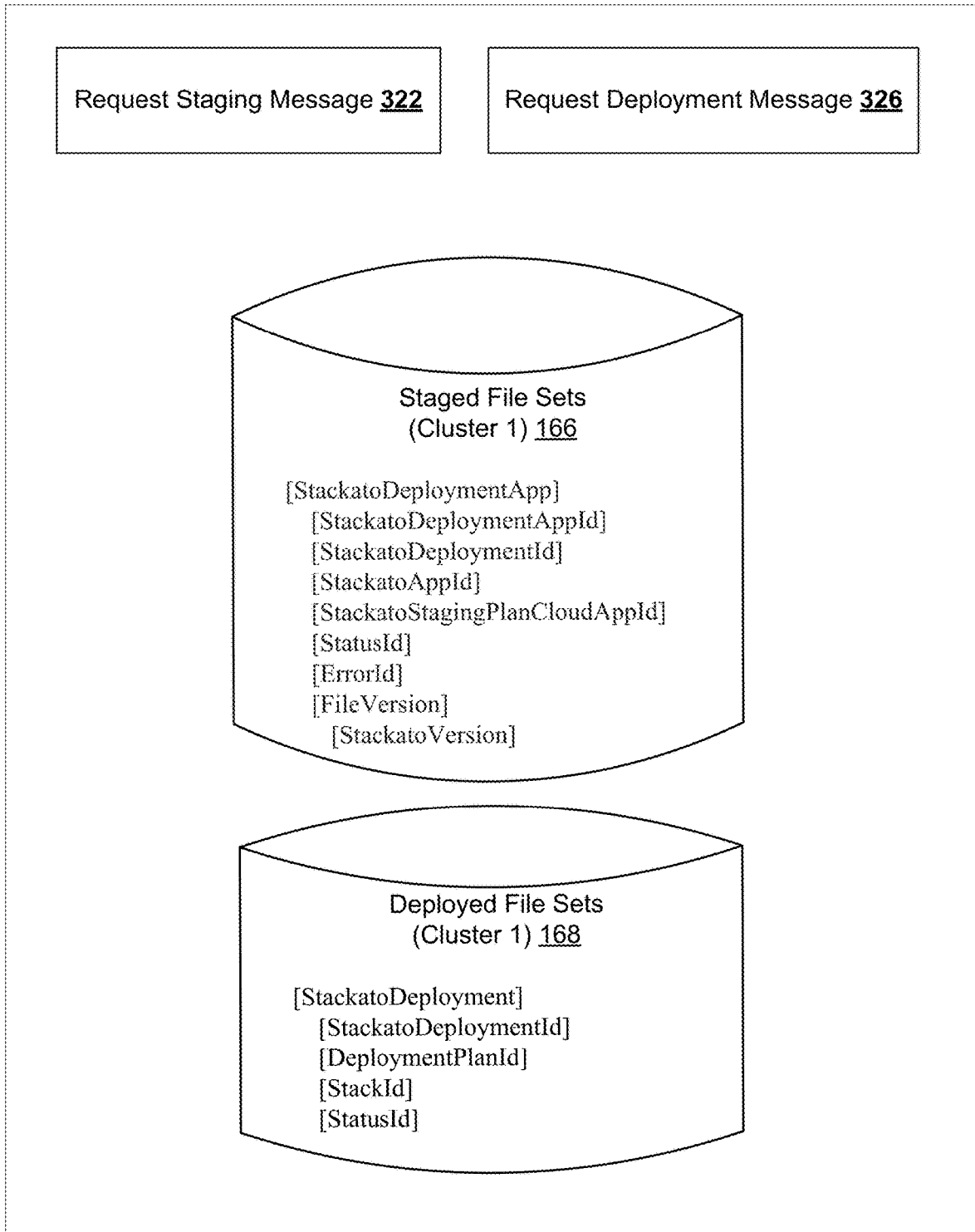
FIG. 3 illustrates messages and data structures for staged and deployed file sets for a deployment management system.

FIG. 3 shows request staging message 322. When the user enters a staging request via the GUI 212, a push request staging message is queued for the apps selected in the staging request, specifying what apps are to be pushed to the new version URL. An asynchronous request handler picks up the request and sends the request to the staging handler, which spins off a thread for mapping each app by URL, and sends push requests to the cloud platform for processing. Upon receipt of the response from the platform, the status of each app gets updated in the staging database. Staged file sets 166 utilize the structure shown, and listed next.

```
[StackatoDeploymentApp]
    [StackatoDeploymentAppId]
    [StackatoDeploymentId]
    [StackatoAppId]
    [StackatoStagingPlanCloudAppId]
    [StatusId]
    [ErrorId]
    [FileVersion]
        [StackatoVersion]
```

The disclosed Stackato-based controller includes access to application and system logs that are aggregated into streams which can be viewed, tailed, filtered, and sent via drains to other log aggregators for archiving and analysis. Application log streams aggregate application logs and relevant messages from all instances. Cloud message streams aggregate cloud messages from all nodes. A message is a single log line or event in a stream. Each message has a key that identifies the stream to which the key belongs.

When staging is requested by a user, a staging request message is dropped into the database queue. The deployment controller for the data center polls, looking for a deployment request, so receives the staging request message directed to the data center service cloud. An example message, submitted by the deployment manager and added to the message queue, for execution of a staging plan is listed next.

```
// Queue staging request
AsyncRequest stagingAsyncRequest = new AsyncRequest
{
    ReferenceId = stackatoStagingPlanCloud.StackatoStagingPlanCloudId,
    Handler = "StackatoStagingRequestHandler",
};
_stackatoAsyncRequestService.Create<long>(stagingAsyncRequest);
```

The connection between staging and deployment includes the following data structure, for StackatoDeploymentApp that defines an app to be staged and deployed. The StatusId is used to track the status of the request, and the FileVersion is the version of the app to be deployed. The StackatoVersion includes the mapping of the Stackato version to the file version.

Also in FIG. 3, a request deployment message 326 gets created when the user requests a deployment; and the event signaling for the apps to be mapped to the production URL is represented as a deployment request pushed onto the event queue. The workstation receives, from a user, selections of the multiple deployable installations and selections of the multiple service clouds, wherein the multiple deployable installations are selectable as a group. An example message for execution of a deployment plan is listed next.

```
// Queue Deployment Request
var deploymentAsyncRequest = new AsyncRequest
{
    ReferenceId = stackatoStagingPlanCloud.StackatoDeploymentId,
    Handler = "StackatoDeploymentRequestHandler",
};
_stackatoAsyncRequestService.Create<long>(deploymentAsyncRequest);
```

Continuing with the Stackato-based implementation description, an asynchronous request handler polls and waits for events for the data center; and picks up the deployment request and sends it to the deploying handler, which spins off a thread for mapping each app. The deployment request travels to the cloud platform for processing. Upon receipt of the response from the platform, the status of each app gets updated in the deployment database. The deployed file sets 168 include the data as specified infra. The DeploymentPlanId is used to track relative to an overall plan that other deployments, such as machine upgrade, can be tracked against. The StackId identifies the stack where customers are provisioned, within the data center service cloud in which the apps will be made available.

```
[StackatoDeployment]
    [StackatoDeploymentId]
    [DeploymentPlanId]
    [StackId]
    [StatusId]
```

Internal software routers direct traffic within the data center service clouds, remapping incoming API URLs from a replaced version to the latest deployable installation. The data center needs to have enough capacity to run both the existing version of a release, version A, and a newly deployed release version B. After version B is deployed, both versions run and the client load shifts from version A to version B, with users automatically routed to version B.

The disclosed system includes using a web user interface to stage deployments, which eases the workload for deployment engineers during releases.

Figure 4:
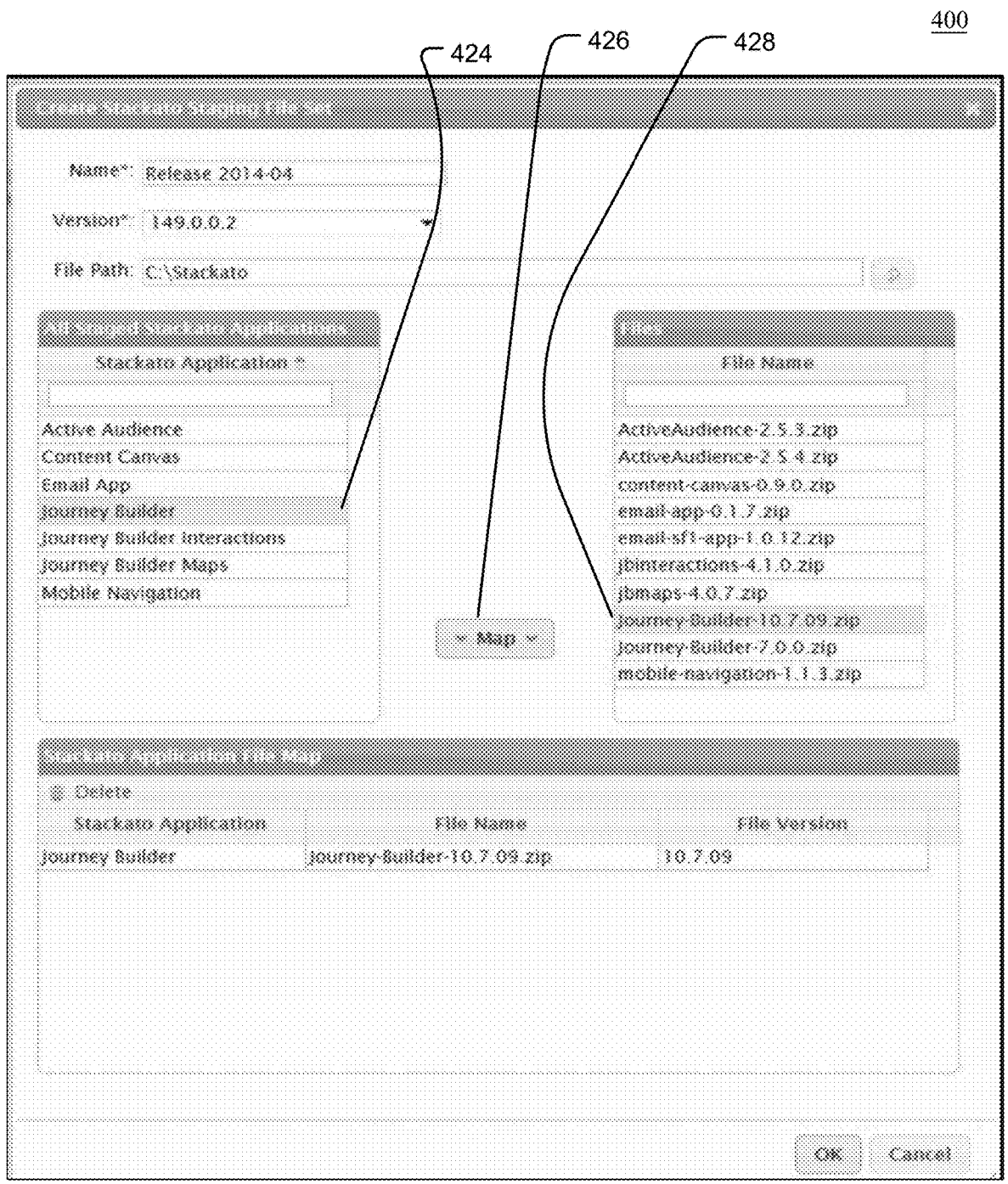
FIG. 4 shows an example user interface for staging file sets.

FIG. 4 shows an example staging file set dialog 400 for the Version 149.0.0.2 release, in which the user can set up a Stackato file map by specifying the mapping between the Stackato applications and their corresponding versioned-files that are going to be deployed for the release. The applications, such as Journey Builder 424, are selected in the list on left and the corresponding version of the application to be deployed, Journey Builder 10.7.09.zip 428 is selected from the list of files on the right. When Map 426 is clicked, the file mapping of the deployment launch specification for the staging and deployment is created.

Figure 5:
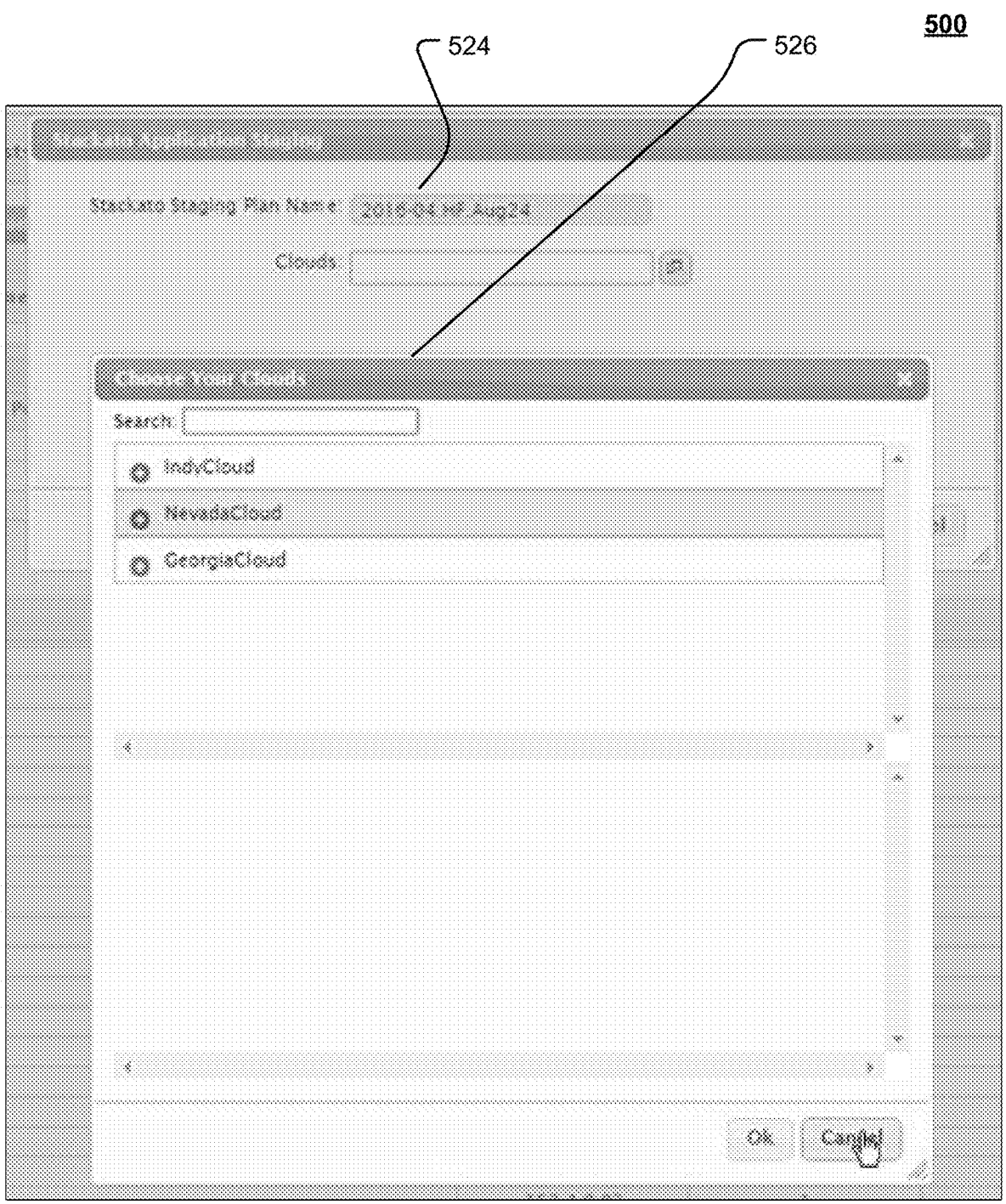
FIG. 5 shows an example user interface for choosing clouds to be staged.

Once the deployment launch specification has been created, the next step is to push and stage the file map, selecting one or more regional clouds, pre-deployment. FIG. 5 shows the application staging dialog 500, with staging plan name 524 2016-04 HF Aug24 with a dialog box to use to choose your clouds 526. The workstation receives, from the user, selections of the multiple service clouds—selecting some, but perhaps not all, available hardware stacks within a particular service cloud, for deployment based on the deployment launch specification.

Staging includes pushing the application files to the data center and sets them into a non-active ready state so they are ready to be activated and deployed when needed. This pre-deployment automated process allows applications to be pushed to the data center cloud before deployment, removing the overhead of pushing and staging that has historically been a part of the deployment of a release.

Figure 6:
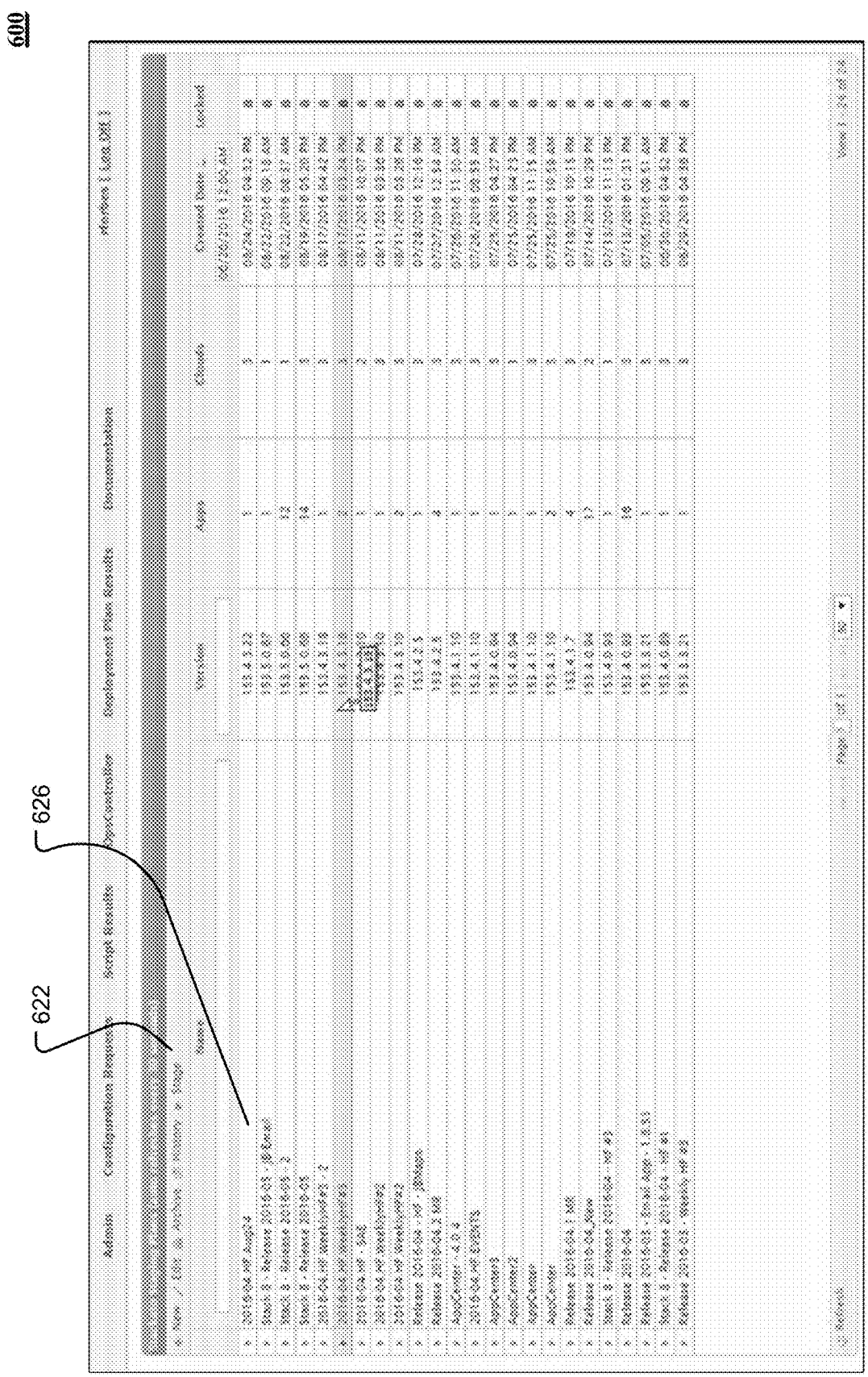
FIG. 6 shows staging plans in an example user interface.

FIG. 6 shows a list of staging plans 600 The staging plans for 2016-04 HF Aug24 626 can be selected, and stage 622 can be selected to send the message to stage the apps that have been configured.

A particular hardware stack, within a particular service cloud, hosts services provided to a particular client organization, such that delayed deployment to the particular hardware stack delays availability to the particular client organization of the latest deployable installation. Deployment activates and makes the apps available.

Once the applications are staged, a deployment engineer can create an activation deployment plan. This is done by choosing a staged plan or plans and the stacks to which to deploy the plans. The creation of these plans happens pre-deployment.

Figure 7:
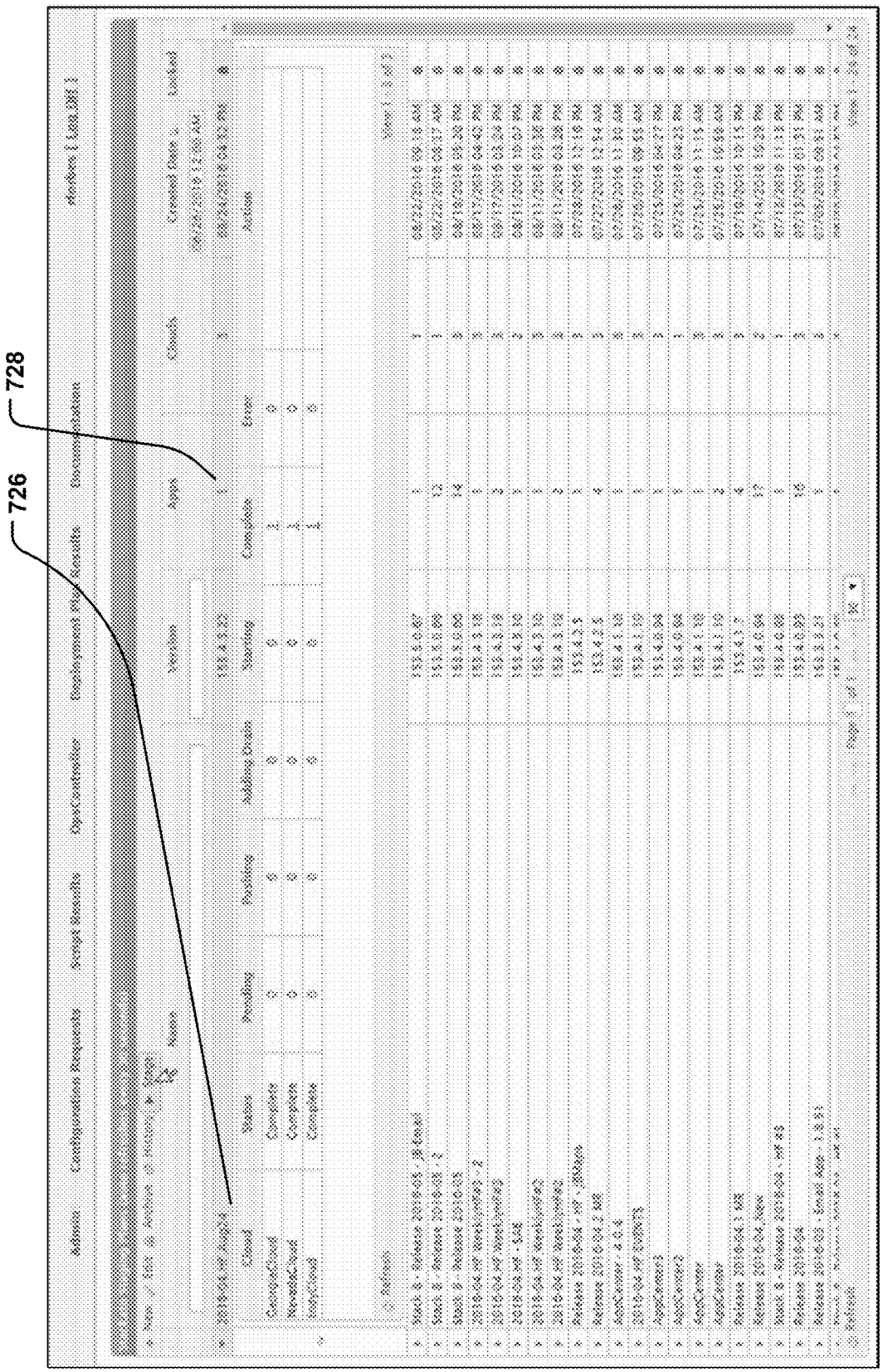
FIG. 7 displays a user interface for staging a deployment for a specific release.

FIG. 7 shows staging results 700 after staging, for release 2016-04 HF Aug24 726, and shows the status as complete 728 for the three selected clouds.

Figure 8:
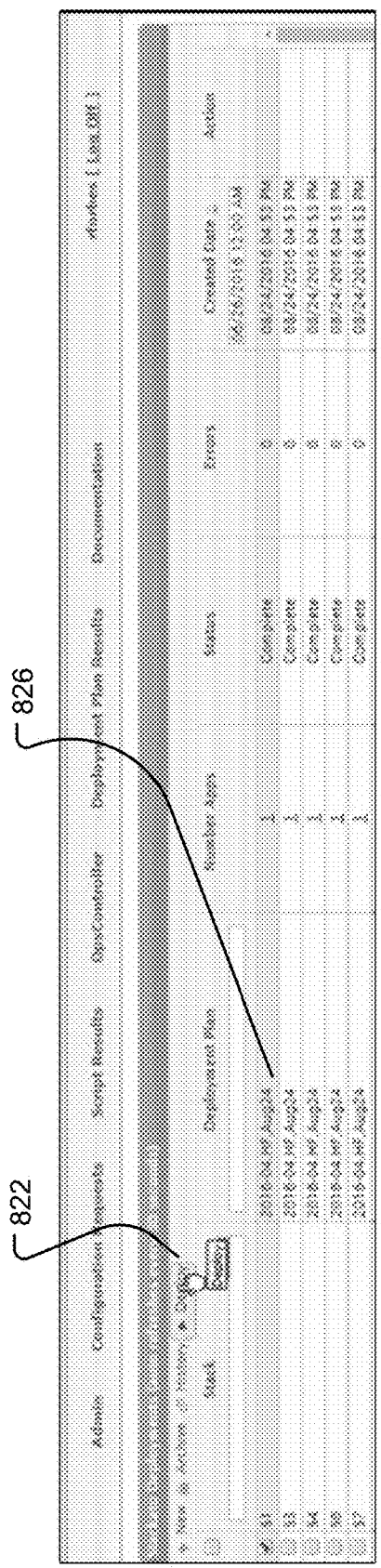
FIG. 8 illustrates a graphical UI for deploying staged applications.

FIG. 8 shows staged apps for deployment plan 800 for 2016-04 HF Aug24 826. To complete the deployment for the multiple deployable installations—the staged apps, the user selects the deployment plans and selects Deploy 822, launching deployment of the multiple deployable installations by the multiple service clouds. That is, the workstation posts a deployment launch task to the messaging queue, from which the deployment controllers draw tasks including the deployment launch task. The deployment controllers verify that a staged application is in a started state prior to remapping the incoming API URLs, and set environment variables on hardware stacks in the multiple service clouds to support the remapping. That is, the handler takes the applications within the deployment plan or plans and maps each app to its appropriate production URLs, making it available to customers. Note that the first of five rows in the deployment plan is selected with a check in FIG. 8. Additional rows can be checked to include additional apps in the deployment.

The deployment controllers inventory dependencies, post-remapping, on the replaced version and mark the replaced version for deletion if no dependencies remain active That is, the deployment controllers un-map the old version of the applications, making them no longer available, after determining that the prior version is no longer in use by clients.

Figure 9:
FIG. 9 shows a GUI for an admin page for monitoring deployment history and completions.

Reports of the completion of deployments are available as updates to the user's screen, which displays the status of each individual app and any errors that might occur. FIG. 9 shows an admin screen 900, accessed by selecting the Admin tab 922, for monitoring of the health of deployments. The staging plans and history are locked 926, as shown in the right column so that a history The history of staging and deployments can be tracked using the ObjectHistory data structures, listed next.

```
[ObjectHistory] (
    [ObjectHistoryId]
    [ObjectType]
    [ObjectId]
    [Message]
    [FieldName]
    [CreatedUtcDate]
    [CreatedBy]
    [AssociatedObjectType]
    [AssociatedObjectId]
    [Source]
);
```

This more consistent, repeatable, and trustworthy process makes it possible to provide full visibility of the app deployments to data centers in the cloud and to view statuses of deployments.

An advantage to staging deployments, setting up the activation and deployment plans for apps ahead of time, includes providing more opportunities for review to help reduce potential errors. Additionally, the disclosed methods and systems make it possible to complete a deployment with fewer human interactions and much more time-efficiently, with fewer human-introduced errors.

Staging and Deployment Workflow

Figure 10:
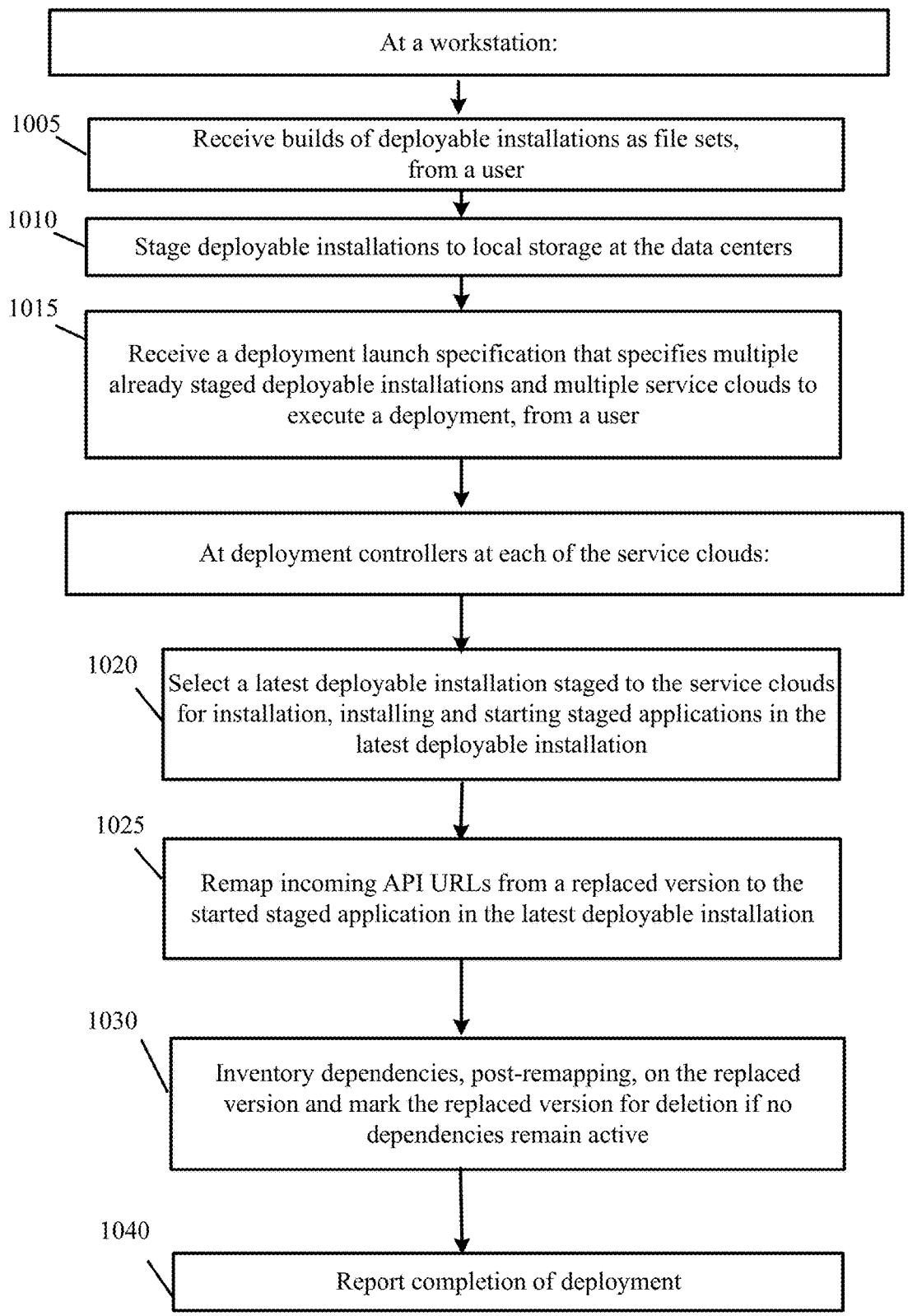
FIG. 10 shows one example workflow for staging and deployment of releases, updates and hot fixes.

FIG. 10 shows an example workflow 1000 of one implementation for staging and deploying to multiple service clouds spanning multiple data centers that include one or more hardware stacks per data center. Workflow 1000 can be implemented at least partially with a database system, e.g., by one or more processors configured to receive or retrieve information, process the information, store results, and transmit the results. Other implementations may perform the steps in different orders and/or with different, fewer or additional steps than the ones illustrated in FIG. 10. Multiple steps can be combined in some implementations.

At action 1005, at a workstation, receive builds of deployable installations as file sets, from a user.

At action 1010, at a workstation, stage deployable installations to local storage at the data centers. This includes uploading the application onto the platform in preparation for deployment.

At action 1015, at a workstation, receive from a user a deployment launch specification that specifies multiple already staged deployable installations and multiple service clouds to execute a deployment. This includes installing the application onto the platform and starting it, in preparation for deployment.

At action 1020, at deployment controllers at each of the service clouds, select a latest deployable installation staged to the service clouds for installation, installing and starting staged application in the latest deployable installation.

At action 1025, at deployment controllers at each of the service clouds, remap incoming API URLs from a replaced version to the started staged application in the latest deployable installation.

At action 1030, at deployment controllers at each of the service clouds, inventory dependencies, post-remapping, on the replaced version and marking the replaced version for deletion if no dependencies remain active.

At action 1040, at deployment controllers at each of the service clouds, report completion of deployment.

Computer System

Figure 11:
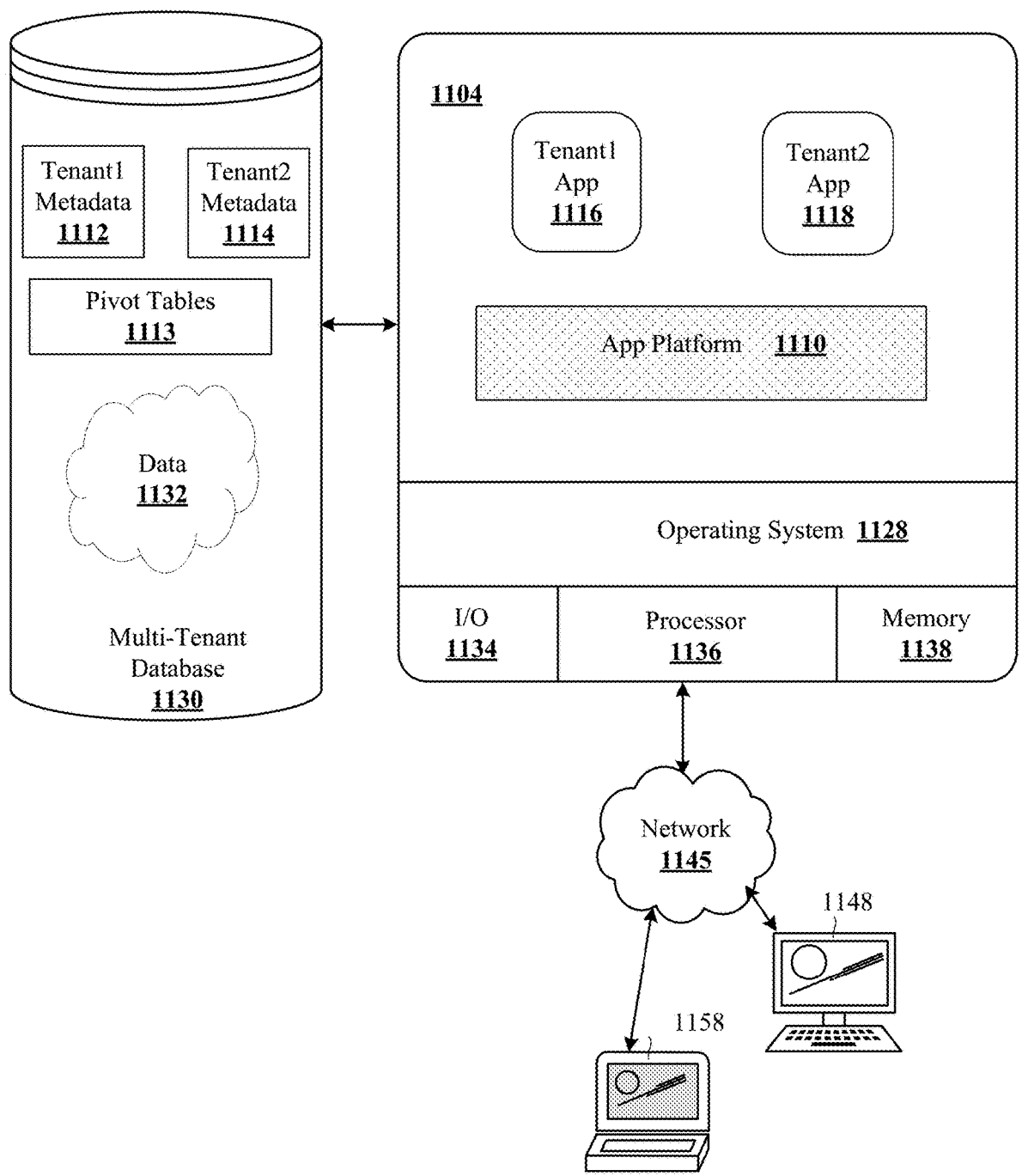
FIG. 11 is a block diagram of an example computer system for implementing staging and deployment in a multi-tenant environment.

FIG. 11 presents a block diagram of an exemplary multi-tenant system 1100 suitable for implementing dynamic allocation of stateful nodes for healing and load balancing in environment 100 of FIG. 1. In general, the illustrated multi-tenant system 1100 of FIG. 11 includes a server 1104 that dynamically creates and supports virtual applications 1116 and 1118, based upon data 1132 from a common multi-tenant database 1130 that is shared between multiple tenants, alternatively referred to herein as a "multi-tenant database". Data and services generated by the virtual applications 1116 and 1118, including GUI clients, are provided via a network 1145 to any number of client devices 1148 or 1158, as desired.

As used herein, a "tenant" or an "organization" refers to a group of one or more users that shares access to common subset of the data within the multi-tenant database 1130. In this regard, each tenant includes one or more users associated with, assigned to, or otherwise belonging to that respective tenant. Stated another way, each respective user within the multi-tenant system 1100 is associated with, assigned to, or otherwise belongs to a particular tenant of the plurality of tenants supported by the multi-tenant system 1100. Tenants may represent users, user departments, work or legal organizations, and/or any other entities that maintain data for particular sets of users within the multi-tenant system 1100. Although multiple tenants may share access to the server 1104 and the database 1130, the particular data and services provided from the server 1104 to each tenant can be securely isolated from those provided to other tenants. The multi-tenant architecture therefore allows different sets of users to share functionality and hardware resources without necessarily sharing any of the data 1132 belonging to or otherwise associated with other tenants.

The multi-tenant database 1130 is any sort of repository or other data storage system capable of storing and managing the data 1132 associated with any number of tenants. The database 1130 may be implemented using any type of conventional database server hardware. In various implementations, the database 1130 shares processing hardware with the server 1104. In other implementations, the database 1130 is implemented using separate physical and/or virtual database server hardware that communicates with the server 1104 to perform the various functions described herein. The multi-tenant database 1130 may alternatively be referred to herein as an on-demand database, in that the multi-tenant database 1130 provides (or is available to provide) data at run-time to on-demand virtual applications 1116 or 1118 generated by the application platform 1110, with tenant1 metadata 1112 and tenant2 metadata 1114 securely isolated.

In practice, the data 1132 may be organized and formatted in any manner to support the application platform 1110. In various implementations, conventional data relationships are established using any number of pivot tables 1113 that establish indexing, uniqueness, relationships between entities, and/or other aspects of conventional database organization as desired.

The server 1104 is implemented using one or more actual and/or virtual computing systems that collectively provide the dynamic application platform 1110 for generating the virtual applications. For example, the server 1104 may be implemented using a cluster of actual and/or virtual servers operating in conjunction with each other, typically in association with conventional network communications, cluster management, load balancing and other features as appropriate. The server 1104 operates with any sort of conventional processing hardware such as a processor 1136, memory 1138, input/output features 1134 and the like. The input/output devices 1134 generally represent the interface(s) to networks (e.g., to the network 1145, or any other local area, wide area or other network), mass storage, display devices, data entry devices and/or the like. User interface input devices 1134 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into server 1104.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 1136 to the user or to another machine or computer system.

The processor 1136 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1138 represents any non-transitory short or long term storage or other computer-readable media capable of storing programming instructions for execution on the processor 1136, including any sort of random access memory (RAM), read only memory (ROM), flash memory, magnetic or optical mass storage, and/or the like. The computer-executable programming instructions, when read and executed by the server 1104 and/or processor 1136, cause the server 1104 and/or processor 1136 to create, generate, or otherwise facilitate the application platform 1110 and/or virtual applications 1116 and 1118, and perform one or more additional tasks, operations, functions, and/or processes described herein. It should be noted that the memory 1138 represents one suitable implementation of such computer-readable media, and alternatively or additionally, the server 1104 could receive and cooperate with external computer-readable media that is realized as a portable or mobile component or application platform, e.g., a portable hard drive, a USB flash drive, an optical disc, or the like.

The application platform 1110 is any sort of software application or other data processing engine that generates the virtual applications 1116 and 1118 that provide data and/or services to the client devices 1148 and 1158. In a typical implementation, the application platform 1110 gains access to processing resources, communications interfaces and other features of the processing hardware using any sort of conventional or proprietary operating system 1128. The virtual applications 1116 and 1118 are typically generated at run-time in response to input received from the client devices 1148 and 1158.

With continued reference to FIG. 11, the data and services provided by the server 1104 can be retrieved using any sort of personal computer, mobile telephone, tablet or other network-enabled client device 1148 or 1158 on the network 1145. In an exemplary implementation, the client device 1148 or 1158 includes a display device, such as a monitor, screen, or another conventional electronic display capable of graphically presenting data and/or information retrieved from the multi-tenant database 1130.

In some implementations, network(s) 1145 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an ORACLE™ compatible database implementation, an IBM DB2 Enterprise Server compatible relational database implementation, a MySQL or PostgreSQL compatible relational database implementation or a Microsoft SQL Server compatible relational database implementation or a NoSQL non-relational database implementation such as a Vampire™ compatible non-relational database implementation, an Apache Cassandra™ compatible non-relational database implementation, a BigTable compatible non-relational database implementation or an HBase or DynamoDB compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

In one implementation, a method of managing deployment to multiple service clouds spanning multiple data centers that include one or more hardware stacks per data center is disclosed. This method is implemented at a workstation and at deployment controllers for each of the multiple service clouds. The workstation and deployment controllers are both computer implemented hardware, running software. Examples of such hardware are PCs, servers, computing clusters, and virtual machines running on computer hardware.

In one implementation, the part of the method carried out at the workstation includes receiving from a user builds of deployable installations as file sets and staging the deployable installations to local storage at the data centers. Staging of the deployable installations to local storage physically present at the data centers is preferred. Bandwidth permitting, the deployable installations could be staged to nonlocal storage, accessed from the data center over a gigabit plus network connection. The workstation part of the method further includes receiving from a user a deployment launch specification that specifies multiple already staged deployable installations and multiple service clouds to execute a deployment. Then, launching asynchronous, concurrent deployment of the multiple deployable installations by the multiple service clouds based on the deployment launch specification. Concurrent deployment means overlapping in time, without necessarily requiring simultaneous deployment. It is recognized that some processes may need to wind down before being replaced. Preferably, two versions of a process can run at the same time, both to support different clients that want to run different versions and to permit overlapping operation while the replaced version winds down.

The deployment controller part of the method, in some implementations, includes selecting a latest deployable installation staged to the service clouds for installation, then installing and starting staged applications in the latest deployable installation. In some implementations, there will only be one deployable installation of the time, so there will not be any selecting of the latest deployable installation. Implementations where multiple deployable installations have been staged, the system can automatically, without explicit specification of the version to deploy, select the latest available version for deployment. The method further includes remapping incoming API URLs from a replaced version to the started staged application in the latest deployable installation. Incoming API URLs are symbolic addresses used by computer-based processes outside of service clouds to reach an application program interface exposed by the service cloud. In some implementations, the method further includes inventorying dependencies, post-remapping, on the replaced version and marking the replaced version for deletion if no dependencies remain active. In this way, implementation versions that no other applications depend on to available are cleaned up and archived or deleted. The method also includes reporting completion of deployment.

The technology disclosed can be described from the perspective of the system, from the perspective of the workstation interacting with deployment controllers, or from the spit perspective of a deployment controller interacting with the workstation and with hardware stacks in a service cloud. A deployment controller receives and implements directives from the workstation, then reports back to results. A workstation sends directives to deployment controllers, relies on them to implement the directives, and receives back reports of deployments.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features that implement staging and deployment launch.

The method can further include causing the staging to local storage at the data centers by the workstation posting a staging task to a messaging queue accessed by the deployment controllers, from which the deployment controllers draw tasks including the staging task.

It can include causing the launching deployment of the multiple deployable installations by the multiple service clouds by the workstation posting a deployment launch task to the messaging queue, from which the deployment controllers draw tasks including the deployment launch task.

It can include receiving by the workstation from a user selections of the multiple deployable installations and selections of the multiple service clouds, wherein the multiple deployable installations are selectable as a group.

In some implementations, it includes receiving by the workstation, from the user, selections of the multiple service clouds further includes selecting some, but not all, available hardware stacks within a particular service cloud, for deployment based on the deployment launch specification. A particular hardware stack, within a particular service cloud, hosts services provided to a particular client organization. As a result, delayed deployment to the particular hardware stack delays availability to the particular client organization of the latest deployable installation.

The deployment controllers can set environment variables on hardware stacks in the multiple service clouds to support the remapping. They can verify that a staged application is in a started state prior to remapping the incoming API URLs. In addition, they can implement the remapping of the incoming API URLs in a routing table of a message router within a deployment controller's respective service cloud.

Combining some of these features, the method can include receiving by the workstation, from the user, selections of the multiple service clouds further includes selecting some, but not all, available hardware stacks within a particular service cloud, for deployment based on the deployment launch specification; remapping of the incoming API URLs in a routing table of a message router within a deployment controller's respective service cloud; and the routing table is granular to a map particular API URLs by client organization, such that different client organizations can run different deployment versions of a single service accessed from outside the service cloud by a single API URL. In the interest of succinctness, just this one combination of features is expressly called out. One of skill in the art will appreciated the many other combinations of features are implied by this disclosure.

Other implementations may include a computer implemented system to perform any of the methods described above, the system including a processor, memory coupled to the processor, and computer instructions loaded into the memory.

An example system implementation manages deployment to multiple service clouds spanning multiple data centers that include one or more hardware stacks per data center. The system includes a workstation and deployment controllers. The workstation includes a first processor, memory coupled to the first processor, and program instructions executable on the first processor that cause the workstation to implement any of the methods described above. Deployment controllers at each of the service clouds, include a second processor, memory coupled to the second processor, and program instructions executable on the second processor that cause the deployment controller to implement any of the methods described above. For both the workstation and the deployment controller, the different perspectives described above and the combinations of features described above apply fully to example system implementations.

Yet another implementation may include a non-transitory tangible computer readable storage medium including computer program instructions that cause a computer to implement any of the methods described above or that are used to build any of the systems described above. The tangible computer readable storage medium does not include transitory signals.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of managing deployment to a plurality of cloud services at data centers that include one or more hardware stacks per data center, the method comprising:
   receiving, at a respective deployment controller of the plurality of cloud services, a deployment launch specification to execute an installation and a deployment;
   installing and starting, at the plurality of cloud services by the respective deployment controller, staged applications to replace one or more applications at one or more of the plurality of cloud services according to the deployment launch specification;
   remapping uniform resource locators (URLs) from a replaced version of the one or more applications, at the plurality of cloud services by the respective deployment controller, to the URLs of the installed and started applications using a routing table that maps the URLs of the one or more applications by client organization such that different client organizations run different deployment versions of a single service accessed from outside the plurality of cloud services by a single URL;
   determining active dependencies of one or more active stacks of at least one of the plurality of cloud services on the replaced version of the one or more applications at the one or more of the plurality of cloud services;
   if no dependencies remain active, marking the replaced version of the one or more applications at the one or more of the plurality of cloud services for deletion, which un-maps the replaced version of the one or more applications from the routing table; and
   transmitting a completion of deployment report.

2. The method of claim 1, further comprising:
selecting at least one of the hardware stacks within the at least one of the plurality of cloud services for the deployment based on the deployment launch specification.

3. The method of claim 2, wherein the at least one hardware stack hosts services provided to a client organization.

4. The method of claim 1, further comprising:
setting environment variables on hardware stacks of the plurality of cloud services to support the remapping.

5. The method of claim 1, further comprising:
verifying that at least one of the staged applications is in a started state prior to remapping the URLs.

6. The method of claim 1, wherein a message router of the respective deployment controller includes the routing table that remaps the URLs.

7. A system that manages deployment to a plurality of cloud services at data centers that include one or more hardware stacks per data center, the system including a workstation and deployment controllers, comprising:
deployment controllers at each of the respective cloud services, each including a processor and memory coupled to the processor to:
receive a deployment launch specification to execute an installation and a deployment;
install and start staged applications to replace one or more application at one or more of the plurality of cloud services according to the deployment launch;
remap uniform resource locators (URLs) from a replaced version of the one or more application to the URLs of the installed and started applications using a routing table that maps the URLs of the one or more applications by client organization such that different client organizations run different deployment versions of a single service accessed from outside the plurality of cloud services by a single URL;
determine active dependencies of one or more active stacks of at least one of the plurality of cloud services on the replaced version of the one or more applications at the one or more of the plurality of cloud services;
mark the replaced version of the one or more applications at the one or more of the plurality of cloud services for deletion if no dependencies remain active, by un-mapping the replaced version of the one or more applications from the routing table; and
transmit a completion of deployment report.

8. The system of claim 7, wherein at least one of the hardware stacks within the at least one of the plurality of cloud services is selected for deployment based on the deployment launch specification.

9. The system of claim 8, wherein the at least one hardware stack hosts services provided to a client organization.

10. The system of claim 7, wherein the deployment controllers are configured to set environment variables on hardware stacks of the plurality of cloud services to support the remapping.

11. The system of claim 7, wherein the deployment controllers are configured to verify that at least one of the staged applications is in a started state prior to remapping the URLs.

12. The system of claim 7, wherein the respective deployment controllers of the plurality of cloud services are configured to remap the URLs in the routing table of a message router.

13. A non-transitory computer readable media, including program instructions, that, when executed by a processor, perform the method comprising:
receiving, at a respective deployment controller of a plurality of cloud services, a deployment launch specification to execute an installation and a deployment;
installing and starting, at the plurality of cloud services by the respective deployment controller, staged applications to replace one or more applications at one or more of the plurality of cloud services according to the deployment launch specification;
remapping uniform resource locators (URLs) from a replaced version of the one or more applications, at the plurality of cloud services by the respective deployment controller, to the URLS of the installed and started applications using a routing table that maps the URLs of the one or more applications by client organization such that different client organizations run different deployment versions of a single service accessed from outside the plurality of cloud services by a single URL;
determining active dependencies of one or more active stacks of at least one of the plurality of cloud services on the replaced version of the one or more applications at the one or more of the plurality of cloud services;
if no dependencies remain active, marking the replaced version of the one or more applications at the one or more of the plurality of cloud services for deletion, which un-maps the replaced version of the one or more applications from the routing table; and
transmitting a completion of deployment report.

14. The non-transitory computer readable media of claim 13, further comprising:
selecting at least one of the hardware stacks within the at least one of the plurality of cloud services for deployment based on the deployment launch specification.

15. The non-transitory computer readable media of claim 13, further comprising:
setting environment variables on hardware stacks of the plurality of cloud services to support the remapping.

16. The non-transitory computer readable media of claim 13, wherein a message router of the respective deployment controller includes the routing table that remaps the URLs.

* * * * *